Sept. 29, 1942.    P. SALVANESCHI    2,297,504
METHOD AND APPARATUS FOR MOLDING PLASTIC MATERIAL
Filed June 14, 1940

Inventor,
P. Salvaneschi
By: Glascock Downing & Seebold
Attorneys.

Patented Sept. 29, 1942

2,297,504

UNITED STATES PATENT OFFICE 2,297,504

METHOD AND APPARATUS FOR MOLDING PLASTIC MATERIAL

Pino Salvaneschi, Broni, Italy; vested in the Alien Property Custodian

Application June 14, 1940, Serial No. 340,602
In Italy June 27, 1939

5 Claims. (Cl. 25—42)

The present invention relates to a method and apparatus for molding plastic material.

Processes are known by which sheets or profiled articles are made with cement paste whereby a thin foil is obtained in a continuous or intermittent manner, in a given thickness resulting from the sum of a number of elementary layers.

In a general manner, such elementary layers are obtained by means of a roller with a permeable core dipping and revolving in a diluted plastic. The water can flow away through the wall of the roller while the substances in suspension are deposited on the dipping roller which in its turn delivers the elementary layer to another wrapping roller. When said wrapping roller has collected a certain number of elementary layers, the slab so obtained is cut along a generatrix of the roller, opened-out and subsequently molded on molds, for instance undulated molds. Once the molding on the molds is finished, the sheet is cut again to size.

Such processes of manufacture on a cylinder have various drawbacks of a technical and economical nature limiting their practical applications.

Processes are also known for obtained moldings, sheets or profiled articles in which a mold is filled with a wet paste, said mold having a porous wall and the paste is subsequently compressed under a very high pressure to drive-off the excess of water and compress the material.

Said process, however, is not properly adapted for obtaining sheets or moldings which are not flat and there remains the great difficulty of distributing the paste so as to obtain the desired thicknesses. At any rate the practical application of such processes is limited by the cost of the plants, by a slow production and by the very high pressures required.

The process forming the object of the present invention, while avoiding the above stated drawbacks allows the direct manufacture of moldings and sheets flat or undulated in any manner, or variously profiled and having variable thicknesses both longitudinally and transversely. In particular it allows the direct manufacture of slabs having the top profile equal to the bottom one.

The pastes which can be used with the present process may vary greatly in their nature and the present method and apparatus is capable of working wood-paste, disintegrated wood, clay, synthetic resins, bitumen or asphaltic pastes, mixtures of rubber with fillers.

The materials may be used dry or wet and in the latter case the liquid or solvent added to them, may be of any nature.

The process forming object of the present invention, is characterized by the feature that the paste is applied directly over the mold reproducing partially the molding, the slab or the profiled articles to be produced, by means of a hopper having one or more of its walls in the shape of a countermold, said walls of the hopper and the mold being partly or wholly subjected to a vibrating motion and to a relative feeding motion between the hopper and the mold, while in the inside of said mold prevails a vacuum, the sheet or molding so obtained being eventually further compressed by the action of a vibrating countermold.

The apparatus shown in the drawing should be considered solely as an example, it being logically possible to vary the details of construction and shape of the machines and of the molds with more suitable ones, so as to apply the principle of the present invention to the various kinds of dry or wet pastes and to the different profiles and shapes of the articles to be manufactured.

Figure 1:
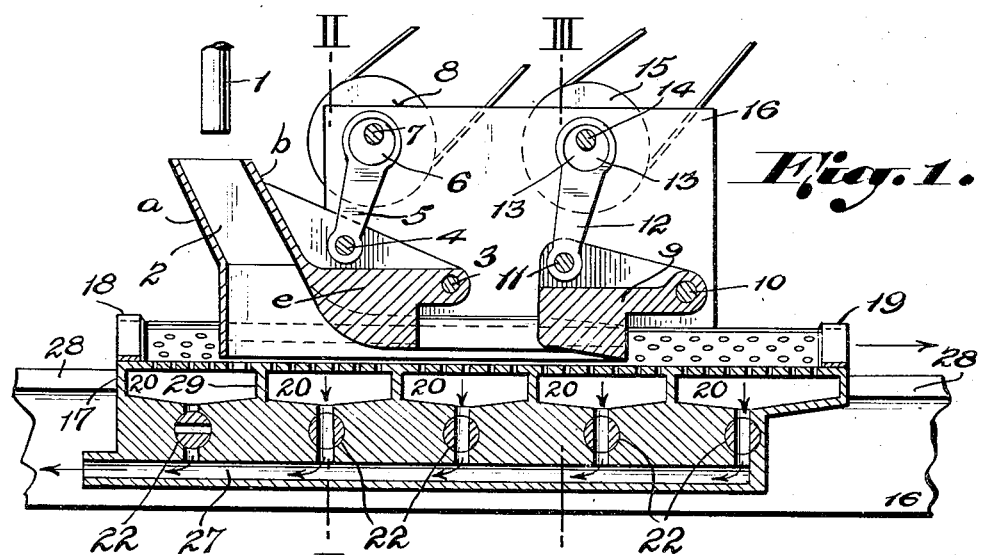
Fig. 1 shows diagrammatically the apparatus for the direct production of undulated sheets, in a longitudinal section.
Figures 2, 3:
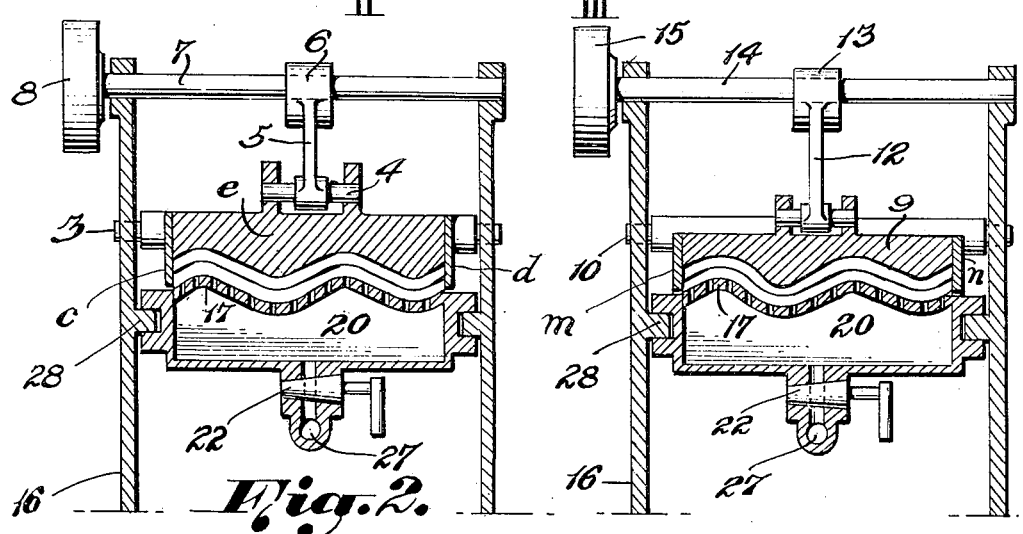
Fig. 2 shows the same apparatus in section along line II—II of Fig. 1.
Fig. 3 shows the same apparatus in section along line III—III of Fig. 1.
Figure 4:
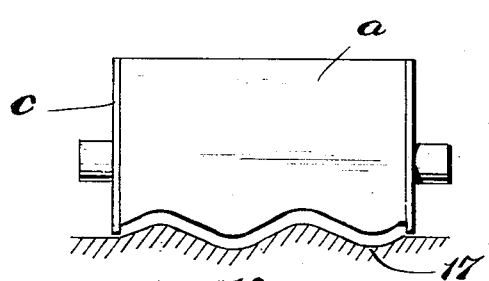
Fig. 4 shows the hopper.

Referring to the drawing, 1 is the pipe feeding the paste to a hopper 2, having four walls $a$, $b$, $c$, $d$. The hopper 2 is hinged on a pivot 3 fixed to the frame 16.

The hopper, by means of a pin 4, a link 5 and an excentric 6, keyed to a shaft 7, driven by a fly wheel 8, swings around the pivot 3.

The mold plate 17 reproduces on its upper surface, the lower surface of the sheet to be produced.

The mold is pierced with small holes placing its upper surface in communication with chambers 20 separated from each other by ribs 29. The holes are limited to the surface which shall receive the paste.

Each chamber 20 can be put in communication with a pipe 21 leading to the vacuum pumps, by means of cocks 22.

One end of the mold plate 17 is provided with a strip-shaped member 18 having an upper profile corresponding to the undulating shape of the upper surface of the mold plate 17. The other end of the mold plate 17 is provided with a similar shaped strip member 19. The thickness of each of the strip members 18 and 19 corresponds to the thickness of the sheet to be molded on the plate 17. The longitudinal space between the strip members 18 and 19 will determine the length of the sheet to be molded on the mold plate 17. The distance between the walls $c$ and $d$ of the hopper 2 will determine the width of the sheet to be molded. The lower end of the wall $a$ of the hopper is provided with an undulating shape corresponding to the shape of the upper surface of the strip members 18 and 19.

When the hopper is vibrated by means of the eccentric 6 the lower surface of the hopper is so arranged that when the mold is in the lowermost position the mold surface carried by the hopper will not damage the strip members 18 and 19. The lower edges of the walls c and d of the hopper are likewise terminated so as to prevent damage to the mold plate 17 when the hopper is in its lowermost position. The wall b in its lower part is shaped as a countermold e for forming the upper profile of the sheet to be molded. The mold plate and the parts secured thereto are supported on guide rails 28 carried by the frame 16 so that the mold plate and the parts connected therewith may slide longitudinally on the guide rails 28.

A further countermold 9 is provided which is adapted to swing on a pin 10. The pivot pin 10 extends transversely of the mold plate and is supported by the frame 16. The countermold 9 is adapted to be pivoted on the pin 10 by means of a link 12 which is connected to the countermold 9 by means of a pin 11. The link 12 is reciprocated by means of an eccentric 13 which is driven by a shaft 14 and a flywheel 15. The countermold 9 is provided with two plates m and n which are similar to the walls c and d of the hopper. The plates m and n limit the width of the sheet to be molded. The lower edges of the plates m and n are terminated so as to prevent damage to the mold plate 17.

When it is desired to mold plastic material and in carrying out the method the mold plate is moved on the guide rails 28 so that the end thereof adjacent the strip member 19 is arranged under the counter-mold e. The plastic material is then introduced into the hopper 2 by means of the pipe 1. The cock 22 adjacent the end of the mold plate which is then under the hopper is opened and the forward chamber 20 is then evacuated.

The fly-wheels 8 and 15 are rotated and the mold 17 is set in motion from left to right, adjusting conveniently the feeding motion which can be continuous or intermittent.

Due to the combined action of gravity, of vibrations, of suction and of the feed of mold 17, over the mold itself the sheet is formed, which reaches the vibrating counter-mold 9 already formed, and is compressed by the latter. Subsequently another cock 22 is opened and as the mold proceeds onward to the right, the other cocks are opened. When mold 17 proceeds further, the member 18 will pass under the wall a of the hopper 2, and therefore any excess of paste will be discharged outside. When on proceeding further, the entire sheet has passed under the counter-mold 9, the sheet will be finished as to thickness, length and width.

At this point, while the sheet is yet laying within its mold, a supporting plate having the same profile is placed upon said sheet.

On upsetting by 180° the mold 17, the freshly made sheet will rest on the supporting plate.

The communication between the pipe 27 and the vacuum pumps is then interrupted and the same pipe is placed in communication with the atmosphere. Thus will be obtained, inside chamber 20, the same outer pressure, so that the sheet will rest with its own weight on the supporting plate which will be stored together with the freshly made sheet.

When the weight of the freshly made sheet is not sufficient to detach it from its mold, once the communication between pipe 27 and the vacuum pumps is cut out, air under pressure might be driven in chamber 20, which will help in detaching the sheet from the mold.

What I claim is:

1. Apparatus for molding plastic material comprising, a frame, a mold plate slidable on said frame, a hopper above said mold plate for guiding a plastic material downwardly onto the mold plate, a mold surface carried by the hopper, a pin pivotally supporting the hopper, a rotatable eccentric, and means connecting the eccentric to the hopper to swing the hopper and the mold surface thereof on said pin whereby vibration of the hopper moves the plastic material therefrom onto the mold plate, said material being thereafter molded between the plate and the mold surface on the hopper.

2. Apparatus for molding plastic material comprising, a frame, a mold plate slidable on the frame, a hopper above said mold plate having a downwardly directed passage for guiding plastic material onto the mold plate, a mold surface carried by said hopper adjacent the mold plate and laterally of said passage, a pin extending transversely of the mold plate pivotally supporting the hopper, means for swinging the hopper on said pin to vibrate the hopper and the mold surface thereof with respect to the mold plate whereby the plastic material is moved from the hopper onto the mold plate and shaped between the plate and the mold surface on the hopper during sliding movement of the mold plate.

3. Apparatus for molding plastic material comprising, a frame, a mold plate slidable on the frame, a hopper above said mold plate having a downwardly directed passage therein for guiding the plastic material onto the mold plate, a mold surface carried by the hopper laterally of said passage and adjacent said mold plate, a horizontal transverse pin pivotally supporting said hopper, a rotatable eccentric, a link connecting the eccentric with the hopper for vibrating the hopper in directions substantially perpendicular to the mold plate, whereby the plastic material is moved onto the mold plate during vibrations of the hopper and shaped between the plate and the mold surface of the hopper during vibrations of the hopper.

4. Apparatus for molding plastic material comprising, a frame, a mold plate having holes therein slidable on the frame, a hopper above said mold plate having a downwardly directed passage therein for guiding the plastic material onto the mold plate, a mold surface carried by the hopper laterally of said passage, means pivotally supporting said hopper, means for swinging the hopper on said supporting means to shake plastic material from the hopper onto the mold plate and mold the same between the mold plate and the mold surface, means providing chambers under the mold plate, and means for selectively evacuating each of said chambers.

5. A method of molding plastic material which comprises, applying the plastic material on a porous mold surface, compressing and vibrating a complementary mold surface upon said plastic material, displacing continuously the first mentioned mold surface with respect to the second mentioned mold surface in a direction substantially parallel to the mold surfaces while applying vacuum under said porous mold surface.

PINO SALVANESCHI.